(12) United States Patent
Najork

(10) Patent No.: US 7,739,281 B2
(45) Date of Patent: Jun. 15, 2010

(54) SYSTEMS AND METHODS FOR RANKING DOCUMENTS BASED UPON STRUCTURALLY INTERRELATED INFORMATION

(75) Inventor: Marc A. Najork, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1124 days.

(21) Appl. No.: 10/663,933

(22) Filed: Sep. 16, 2003

(65) Prior Publication Data

US 2005/0060297 A1    Mar. 17, 2005

(51) Int. Cl.
G06F 7/00 (2006.01)
G06F 17/30 (2006.01)

(52) U.S. Cl. .................................................. 707/735
(58) Field of Classification Search ................. 707/735
See application file for complete search history.

(56) References Cited

U.S. PATENT DOCUMENTS

| | | | | |
|---|---|---|---|---|
| 2,935,732 | A * | 5/1960 | Guerber | 707/7 |
| 6,285,999 | B1 | 9/2001 | Page | 707/5 |
| 6,963,867 | B2 * | 11/2005 | Ford et al. | 707/3 |
| 2002/0078045 | A1 * | 6/2002 | Dutta | 707/7 |
| 2004/0034633 | A1 * | 2/2004 | Rickard | 707/5 |

FOREIGN PATENT DOCUMENTS

JP        04160540        *  5/1992

OTHER PUBLICATIONS

Bharat et al., Improved Algorithms for Topic Distillation in a Hyperlinked Environment, Proceedings of the 21st annual international ACM SIGIR conference on Research and development in information retrieval, pp. 104-111, ACM, 1998.*

Dhyani, D. et al, "Deriving and Verifying Statistical Distribution of a Hyperlink-Based Web Page Quality Metric;" *Data & Knowledge Engineering*, 2003; vol. 46, No. 3, pp. 291-315.

(Continued)

*Primary Examiner*—Neveen Abel Jalil
*Assistant Examiner*—Michael J Hicks
(74) *Attorney, Agent, or Firm*—Woodcock Washburn LLP

(57) ABSTRACT

Systems and methods for ranking Web pages based on hyperlink information in a manner that is resistant to nepotistic links are provided. In one embodiment, a Web search service is provided for returning quality query results. The vulnerability of existing ranking algorithms, such as PageRank, to Web pages that are artificially generated for the sole purpose of inflating the score of target page(s) is addressed. Intuitively, it is recognized that it is less likely to reach a particular page on a Web server having many pages via a random jump than it is to reach a particular page on a Web server having few pages, which implies that the influence of such a page upon another page by linking to, or endorsing, the other page is diminished. Thus, in various non-limiting embodiments, each Web server, not each Web page, is assigned a guaranteed minimum score. This minimum score assigned to a server can then be divided among all the pages on that Web server.

29 Claims, 9 Drawing Sheets

OTHER PUBLICATIONS

Upstill, T., "Query-Independent Evidence in Home Page Finding;" *ACM Transactions on Information Systems*; 2003; vol. 21, No. 23, pp. 286-313.

Haveliwala, Taher H., "Topic-Sensitive PageRank: A Context-Sensitive Ranking Alborithm for Web Search;" *IEEE Transactions on Knowledge and Data Engineering*; 2003; 15(4), 784-796.

Devanshu, D., "A Survey of Web Metrics;"*ACM Computing Surveys*; 2002; 34(4), 469-503.

Thelwall, M., "Subject Gateway Sites and Search Engine Ranking;" *Online Information Review*, 2002, 26(2), 101-107.

Rafiei,D., "What Is This Page Known For? Computing Web Page Reputations;" *Computer Networks*, 2000; 33(1-6), 823-835.

Henzinger, M.R., "Measuring Index Quality Using Random Walks on the Web;" *Computer Networks* 1999; 31(11-16),1291-1303.

Brin, S., "The Anatomy of a Large-Scale Hypertextual Web Search Engine;" *Computer Networks and ISDN Systems*;1998; 30(1-7),107-117.

Song, Ju-ping, et al., "Improved PageRank Algorithm for Ordering Web Pages;" *Journal of Shanghai Jiaotong University*; Shanghai Jiaotung University Press, China, Mar. 2003; vol. 37, No. 3, pp. 397-400 (English Abstract attached).

Chen, Yen-Yu, et al."I/O-Efficient Techniques for Computing Pagerank;" *CIKM*, 2002, 549-557.

Z. Chen, et al. "A Unified Framework for Web Link Analysis;" *WISE, 2002, Proceedings of the Third International Conference on Web Information Systems Engineering*, IEEE Comput. Sci, 2002; 63-70.

Pretto, L, "A Theoretical Analysis of Google's PageRank;" *Proceedings of 9$^{th}$ International Symposium, String Processing and Information Retrieval 2002*, Sep. 11-13, 2002, Lisbon, Portugal; Springer-Verlag, Germany, 2002; (Lecture Notes in Computer Science, vol. 2476), pp. 131-144.

Baeza-Yates, R. et al. "Web Structure, Dynamics and Page Quality;" *Proceedings of 9$^{th}$ International Symposium, String Processing and Information Retrieval 2002*, Sep. 11-13, 2002, Lisbon, Portugal; Springer-Verlag, Germany, 2002; (Lecture Notes on Computer Science, vol. 2476), pp. 117-130.

Pandurangan, G., "Using PageRank to Characterize Web Structure;"*Proceedings of 8$^{th}$ Annual International Conference, Computing and Combinatorics (COCOON) 2002*, Aug. 15-17, 2002, Singapore; Springer-Verlag, Germany, 2002; (Lecture Notes in Computer Science, vol. 2387), pp. 330-339.

Kim, S.J., et al. "An Improved Computation of the PageRank Algorithm;" *Proceedings of 24$^{th}$ BCS-IRSG European Colloquium on IR Research, Advances in Information Retrieval*, Mar. 25-27, 2002, Glasgow, UK; Springer-Verlag, Germany, 2002; (Lecture Notes in Computer Science, vol. 2291), pp. 73-85.

Kamvar, S.D. et al., "Exploiting the Block Structure of the Web for Computing PageRank", *Technical Report*, 2003, 1-13, XP-002301858.

Page, L. et al., "The PageRank Citation Ranking: Bringing Order to the Web", *Technical Report*, 1998, 1-17, XP-002213518.

Thelwall, M., "Conceptualizing Documentation on the Web: An Evaluation of Different Heuristic-Based Models for Counting Links between University Web Sites", *Journal of the American Society for Information Science and Technology Wiley for ASIS*, 2002, 53(12), 1-18, XP-002301859.

\* cited by examiner

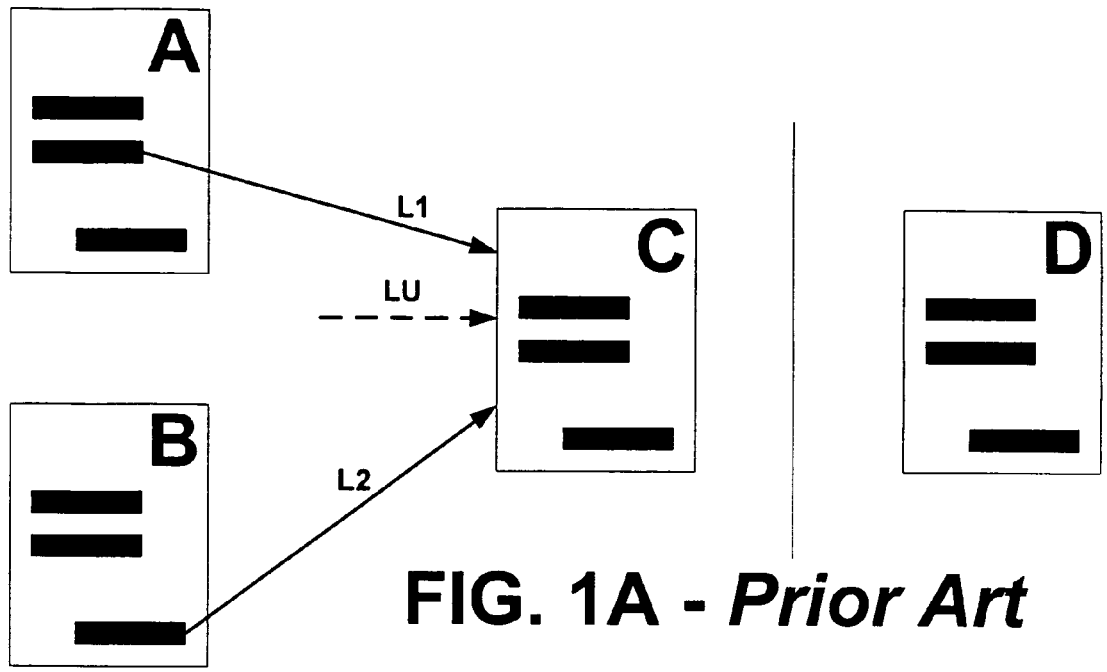
FIG. 1A - *Prior Art*
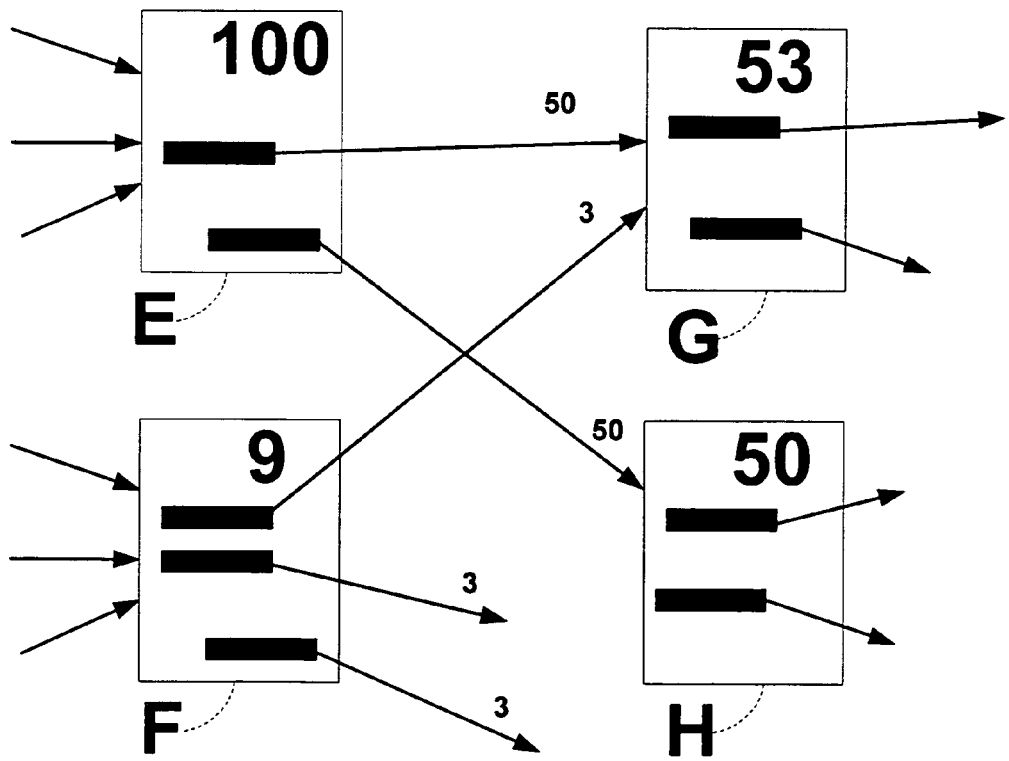
FIG. 1B - *Prior Art*

SYSTEMS AND METHODS FOR RANKING DOCUMENTS BASED UPON STRUCTURALLY INTERRELATED INFORMATION

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2003, Microsoft Corp.

FIELD OF THE INVENTION

This invention relates to the ranking of documents based upon structurally interrelated information. More particularly, this invention relates to the ranking of Web pages based upon hyperlink information in a manner that is resistant to nepotistic, or self-serving, links.

BACKGROUND

Web search service(s) accept a query, e.g., from a user or an application, and return a list of results, e.g., documents or links to documents, which satisfy the query. It should be noted that the term "document" as used herein refers to any content that can be retrieved, and should not be construed to be limited to files, such as word processing documents or Web pages. To provide a satisfactory experience, this list of results should be ordered while considering that the documents that are most relevant to the user should appear first. A multitude of algorithms for ranking documents currently exist, and most Web search engines employ several of such algorithms, and rank the results of a query based on a combination of the ranks assigned by the different ranking algorithms.

The multitude of existing ranking algorithms can be classified based upon whether they are query-dependent (also called dynamic) or query-independent (also called static). Query-dependent ranking algorithms use the terms in the query while query-independent ranking algorithms do not; that is, query-independent ranking algorithms assign a quality score to each document on the Web. Consequently, query-independent ranking algorithms can advantageously be performed ahead of time and do not need to be rerun whenever a query is submitted.

Ranking algorithms can also be broadly classified into content-based, usage-based, and link-based ranking algorithms. Content-based ranking algorithms use the words in a document to rank the document (for example, a query-dependent content-based ranking algorithm might give higher scores to documents that contain the query terms early on in the document or in a large or boldfaced font). Usage-based ranking algorithms rank Web pages based on an estimate of how often they are viewed; such estimates can be produced by examining Web proxy logs or by monitoring click-throughs on a search engine's results pages. Finally, link-based ranking algorithms use the hyperlinks between Web pages to rank Web pages.

For example, a very naive static link-based ranking algorithm might assign a score to each Web page that is proportional to the number of links pointing to the page ("backlinks"), with the idea being that the links from other pages pointing to a page "endorse" that page. For instance, as shown in FIG. 1A, Web pages, A, B, C and D each contain three links to other Web pages ("outlinks"), as represented by the black rectangles in the Web pages. In this example, using the static link-based ranking algorithm, page D receives a lower score than page C because page D has no backlinks, whereas page C has one backlink L2 from page B and one backlink L1 from page A. It is noted that having downloaded pages A, B, C and D, it is deterministic how many outlinks each has, and where they link to, because the page can be read, but there may be yet some unknown backlinks, such as backlink LU, from some location not yet known that cannot be factored into the algorithm. The main drawback of this naive approach is that each "endorsement" is treated equally, making it an easy system to exploit.

PageRank is by far the most well-known query-independent link-based ranking algorithm, and accordingly its principles are set forth herein. PageRank builds upon the principles of the naive static link-based system of FIG. 1A by adding a recursive layer to the system. As illustrated in FIG. 1B, four Web pages are illustrated and the intuition of PageRank is shown. With PageRank, the score of the endorsing page is taken into account when assigning a score to the endorsed page. Thus, the weight of an endorsement from Web page E (with a score of 100) influences the score given to Web page G much more than an endorsement from Web page F (with a score of 9). Intuitively, one can think of the score of the endorsing page being divided up among its endorsees.

Mathematically, the intuition of the PageRank algorithm can be explained as follows: Assume that the set of known Web pages and links between them induces a graph with vertex set V (where each vertex corresponds to a Web page) and edge set E (where each edge (u,v) corresponds to a hyperlink from page u to page v). Let |V| denote the size of the set V, let O(u) denote the out-degree of vertex u (that is, the number of hyperlinks embedded in Web page u), and let p be a number between 0 and 1 (say, 0. 15). The PageRank R(v) of a Web page v is defined to be:

$$R(v) = \frac{p}{|V|} + (1-p) \sum_{(u,v) \in E} \frac{R(u)}{O(u)}$$

The PageRank formula is often explained as follows. Imagine a Web surfer who is performing a random walk on the Web. At every step along the walk, the surfer moves from one Web page to another, using the following algorithm: with some probability p, the surfer selects a Web page uniformly at random and jumps to it; otherwise, the surfer selects one of the outgoing hyperlinks in the current page uniformly at random and follows it. Because of this metaphor, the number p is sometimes called the "jump probability"—the probability that the surfer will jump to a completely random page. If the Web surfer jumps with probability p and there are |V| Web pages, the probability to jump to a particular page is p/|V|. Since any page can be reached by jumping, every page is guaranteed a score of at least p/|V|.

PageRank scores can be used to rank query results. With all other factors being the same, a search engine employing PageRank will rank pages with high PageRank scores higher than those with low scores. Since most users of search engines examine only the first few results, operators of commercial Web sites have a vested interest that links to their sites appear early in the result listing, i.e., that their Web pages receive high PageRank scores. In other words, commercial Web site operators have an incentive to artificially increase the PageRank scores of the pages on their Web sites.

By analyzing the PageRank formula, it becomes evident that one way to increase the PageRank score of a Web page v is by having lots of other pages link to it. This is because the idea that Web pages are capable of endorsing other Web pages via their outlinks is at the heart of PageRank. If all of the pages that link to v have low PageRank scores, each individual page will contribute only very little. However, since every page is guaranteed to have a minimum PageRank score of p/|V|, links from many such low quality pages can still contribute a sizable total. This exposes a vulnerability of the PageRank algorithm.

In practice, this vulnerability of PageRank is being exploited by Web sites that contain a very large set of pages whose only purpose is to "endorse" their main home page. Typically, these endorsing pages contain a link to the page that is to be endorsed, and another link to another endorsing page. All the endorsing pages are created automatically on the fly. Thus, a Web crawler, once it has stumbled across any of the endorsing pages, continues to download more endorsing pages (because of the fact that endorsing pages link to other endorsing pages), thereby accumulating a large number of them. This large number of pages, all of them endorsing a single page, artificially inflates the PageRank score of the page that is being endorsed. The techniques used to artificially inflate PageRank scores are colloquially known as "link spamming" or "link spam."

It is also known that personalized PageRank scores can create a view of the Web from a particular perspective. For example, by taking a user's bookmarks and inflating the PageRank scores of those pages in the user's bookmarks, a personalized PageRank scoring system is achieved. In essence, the user, designating a Web page as a bookmark, has implicitly endorsed the Web page as one upon which the user would like a scoring system to be based. While it is rare that a user would select a "link spam" page as a bookmark, let alone many "link spam" pages, the idea of personalized PageRank does not explicitly deal with the problem of link spamming because there is still a minimum score associated with each link spam Web page.

Thus, while the basic idea is sound, the results of PageRank are subject to interference introduced by nepotistic links, i.e., a family of pages can be created for the purpose of self-endorsement and promotion without consideration of the real merit of the endorser or the endorsee. While it is known that the problem of link spam exists with respect to PageRank scores, a solution has eluded the art.

Accordingly, an improved query-independent link-based ranking algorithm is desired. More particularly, improved ranking systems and methods are desired that significantly reduce the effect(s) of nepotistic links. Furthermore, improved ranking systems and methods are desired that reduce a link spammer's incentive to create a family of self-endorsing Web pages for the purpose of artificially inflating PageRank scores associated with target Web page endorsee (s).

SUMMARY OF THE INVENTION

In consideration of the above-identified shortcomings of the art, the present invention provides systems and methods for ranking documents based upon information about the structural interrelationships of the documents. The systems and methods of the invention can be used for ranking Web pages based on hyperlink information in a manner that is resistant to nepotistic links. In various embodiments, the invention is implemented in a Web search service to return quality query results. The present invention addresses the vulnerability of existing ranking algorithms, such as PageRank, to Web pages that are artificially generated for the sole purpose of inflating the score of target page(s). Intuitively, the invention recognizes that it is less likely to reach a particular page on a Web server having many pages via a random jump than it is to reach a particular page on a Web server having few pages, which implies that the influence of such a page upon another page by linking to, or endorsing, the other page is diminished. Thus, in various non-limiting embodiments, the invention assigns each Web server, not each Web page, a guaranteed minimum score. This minimum score assigned to a server can then be divided among all the pages on that Web server.

Other advantages and features of the invention are described below.

BRIEF DESCRIPTION OF THE DRAWINGS

The systems and methods for providing improved ranking algorithms in accordance with the present invention are further described with reference to the accompanying drawings in which:

FIGS. 1A and 1B are illustrative of prior art techniques for ranking Web pages according to static link-based and PageRank algorithms, respectively;

DETAILED DESCRIPTION OF THE INVENTION

Overview

Figure 2A:
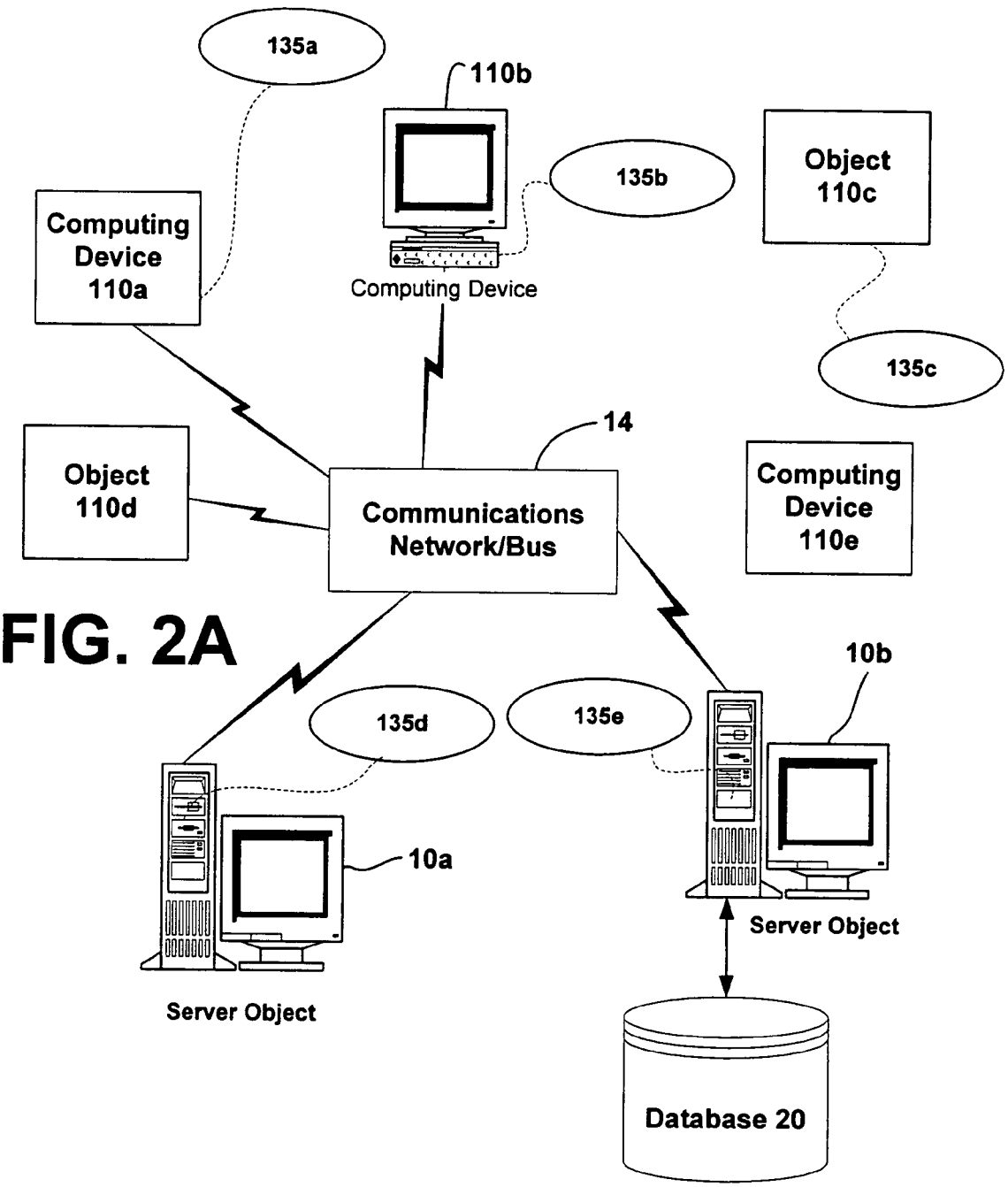
FIG. 2A is a block diagram representing an exemplary network environment having a variety of computing devices in which the present invention may be implemented.

As mentioned, the PageRank algorithm takes on the audacious task of condensing every page on the Web into a single number, its PageRank. PageRank is a global ranking of all Web pages, regardless of their content, based solely on their location in the Web's graph structure.

Using PageRank, search results are ordered so that more important and central Web pages are given preference. The intuition behind PageRank is that it uses information which is external to the Web pages themselves—their backlinks, which provide a kind of peer review. Furthermore, backlinks from "important" pages are considered more significant than backlinks from average links by recursive definition.

It is also known that personalized PageRank scores can create a view of the Web from a particular perspective, e.g., by taking a user's bookmarks and inflating the PageRank scores of those pages in the user's bookmarks; however, personalized PageRank does not explicitly deal with the problem of link spamming because there is still a minimum score associated with each link spam Web page. Accordingly, a link spammer can still create (automatically, if desired) a multitude of Web pages on a single Web server, each having their own minimum PageRank score, that artificially inflate the score of a target endorsee Web page by endorsing each other and the target endorsee Web page. The multitude of Web pages that a link spammer creates typically any one or more of (A) will have the same symbolic host name, (B) will be associated with the same domain or (C) will be associated with the same IP address.

The invention addresses this vulnerability by recognizing that it is less likely that a random jump will reach a particular page on a Web server having many pages than it is to reach a particular page on a Web server having few pages. This implies that the influence of such a page upon another page by linking to, or endorsing, the other page is diminished. Thus, in various non-limiting embodiments, the invention assigns each Web server, not each Web page, a guaranteed minimum score. This minimum score can then be divided among all the pages on that Web server.

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for ranking documents in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services. Downloading and analyzing Web pages is particularly relevant to those computing devices operating in a network or distributed computing environment, and thus the ranking algorithms and techniques in accordance with the present invention can be applied with great efficacy in those environments.

Distributed computing provides sharing of computer resources and services by exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may implicate the ranking algorithms and processes of the invention.

FIG. 2A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices that provide services to the system of FIG. 2A, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the ranking processes in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to ranking documents having interrelated links according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which make use of the ranking techniques in accordance with the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network (s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2A, computers 110a, 110b, etc. can be thought of as clients and computers 10a, 10b, etc. can be thought of as the server where server 10a, 10b, etc. maintains the data that is then replicated in the client computers 110a, 110b, etc., although any computer can be considered a client, a server, or both, depending on the circumstances. Any of these computing devices may be processing data or requesting services or tasks that may implicate the ranking techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the ranking techniques of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 2A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to implement ranking of documents having structurally interrelated links.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 2B:
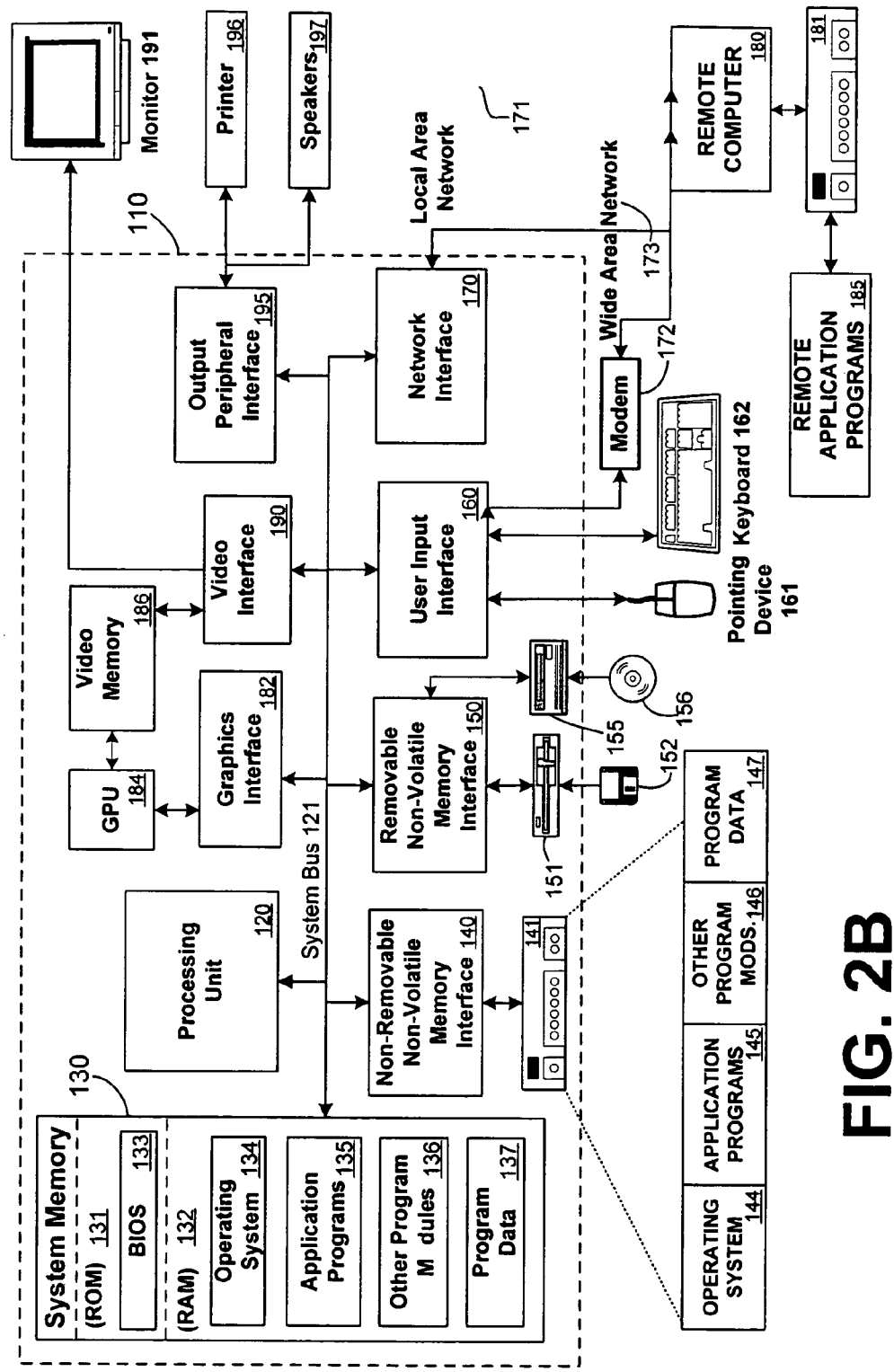
FIG. 2B is a block diagram representing an exemplary non-limiting computing device in which the present invention may be implemented.

FIG. 2B and the following discussion are intended to provide a brief general description of a suitable computing environment in connection with which the invention may be implemented. It should be understood, however, that handheld, portable and other computing devices and computing objects of all kinds are contemplated for use in connection with the present invention, i.e., anywhere where that interfaces with Web pages or other structurally interrelated documents in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the ranking techniques in accordance with the invention.

Although not required, the invention can be implemented via an operating system, for use by a developer of services for a device or object, and/or included within application software that operates in connection with the ranking techniques of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 2B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2B illustrates operating system 134, application programs 135, other program modules 136, and program data 137.

The computer 110 may also include other removable/non-removable, volatile/nonvolatile computer storage media. By way of example only, FIG. 2B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2B provide storage of computer readable instructions, data structures, program modules and other data for the computer 110. In FIG. 2B, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186, wherein the application variables of the invention may have impact. GPUs 184, however, are but one example of a coprocessor and thus a variety of coprocessing devices may be included in computer 110, and may include a variety of procedural shaders, such as pixel and vertex shaders. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2B. The logical connections depicted in FIG. 2B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., NET, includes servers, building-block services, such as Web-based data storage and downloadable device software. Generally speaking, the NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software residing on a computing device, one or more portions of the invention may also be implemented via an operating system, application programming interface (API) or a "middle man" object, a control object, hardware, firmware, intermediate language instructions or objects, etc., such that the methods may be included in, supported in or accessed via all of the languages and services enabled by managed code, such as NET code, and in other distributed computing frameworks as well.

Systems and Methods for Ranking Web Pages

As mentioned above in the background, the present invention addresses the vulnerability of existing ranking algorithms, such as PageRank, to Web pages that are artificially generated for the sole purpose of inflating the score of target Web page(s). Assuming that a Web surfer is going to randomly jump to a particular server, the invention recognizes that it is less likely that the surfer will "land" on a particular page on a Web server having many pages than it is that the surfer will "land" on a particular page on a Web server having few pages. Applying this principle, when applying a ranking algorithm, the invention diminishes the influence of endorsements when they originate from the same server. To achieve this reduction of influence, in various non-limiting embodiments, the invention assigns each Web server, not each Web page, a guaranteed minimum score. This minimum score assigned to the server can then be divided among all the pages on that Web server. Thus, the creation of an arbitrary large number of nepotistic links via a plurality of pages on a Web server achieves no better "endorsement value" than a relatively small number of nepotistic links on a few pages on a Web server. Generally, the arbitrary large number of nepotistic links any one or more of (A) will have the same symbolic host name, (B) will be associated with the same domain or (C) will be associated with the same IP address. In one embodiment, the invention is implemented in a Web search service for the purpose of returning quality query results to a user.

It is noted that several possible definitions of what constitutes a Web server exist: A Web server might be defined by a symbolic host name (e.g., www.google.com), a common domain, or it might be defined by one (or several) IP addresses (e.g. 207.46.134.222). While implementations utilizing either definition of a Web server address the link spam problem, the latter two definitions are more suitable for the purpose of the invention and behave as a better deterrent to link spammers, since it is possible to configure a DNS server to resolve an almost infinite number of host names (RFC 1035 limits host names to be at most 255 characters long, each character being a letter, a digit, or a hyphen. So, there are $37^{255}$ possible host names, which for all practical purposes is "almost infinite"), just as it is possible to configure a Web server to serve an infinite number of Web pages. The following explanations use each definition in turn for two alternate embodiments.

In a first embodiment of a ranking metric in accordance with the invention, a Web server is defined by its symbolic host name. h(u) denotes the host name component of URL u and H is the set of all hosts, that is:

$$H=\{h(v):v \in V\}$$

$V^H(h)$ is the set of URLs served by host h, that is:

$$V^H(h)=\{v:v \in V \wedge h(v)=h\}$$

These two definitions are then used in the definition of a first new ranking metric $R^H$ in accordance with a first embodiment of the invention, which is set forth as follows:

$$R^H(v) = \frac{p}{|H|} \frac{1}{|V^H(h(v))|} + (1-p) \sum_{(u,v) \in E} \frac{R^H(u)}{O(u)}$$

In a second embodiment of a ranking metric in accordance with the invention, a Web server is defined by its domain name. d(u) denotes the domain name component of URL u and D is the set of all domains, that is:

$$D=\{d(v):v\in V\}$$

$V^D(d)$ is the set of URLs served by web servers in domain d, that is:

$$V^D(d)=\{v:v\in V \wedge d(v)=d\}$$

These two definitions are then used in the definition of a second new ranking metric $R^D$ in accordance with a second embodiment of the invention, which is set forth as follows:

$$R^D(v) = \frac{p}{|D|} \frac{1}{|V^D(d(v))|} + (1-p) \sum_{(u,v)\in E} \frac{R^D(u)}{O(u)}$$

In a third embodiment of the invention, a Web server is defined by its set of IP addresses. A(u) denotes the set of IP addresses from which a URL u may be served (that is, the set of IP addresses to which h(u) resolves). A is the set of all IP addresses, that is:

$$A = \bigcup_{v \in V} A(v)$$

$V^A(a)$ is the set of URLs served by IP address a, that is:

$$V^A(a)=\{v:v\in V \wedge a\in A(v)\}$$

These two definitions are then used in the definition of a third new ranking metric $R^A$ in accordance with the third embodiment of the invention, which is set forth as follows:

$$R^A(v) = \frac{p}{|A|} \sum_{a\in A(v)} \frac{1}{|V^A(a)|} + (1-p) \sum_{(u,v)\in E} \frac{R^A(u)}{O(u)}$$

Figure 3A:
FIGS. 3A to 3G illustrate the intuition behind the prevention of link spam according to the present invention.
Figure 3B:
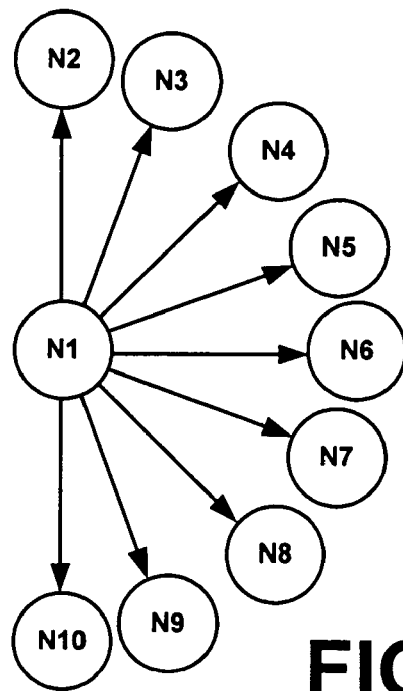
Figure 3C:
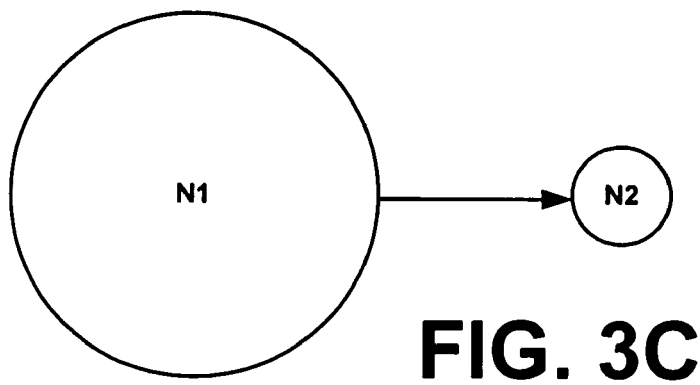

The invention is now described with reference to FIGS. 3A to 3G. FIG. 3A illustrates a first node N1 (e.g., a document or Web page) which has a link to a second node N2. The intuition of PageRank is that N2 is a better page than a node with no incoming link at all because N1 endorses or "validates" the existence of N2 by linking to it. The intuition of PageRank can further be explained by comparing FIG. 3B to FIG. 3A. Since in FIG. 3A, N1 links to only one node N2, whereas in FIG. 3B, node N1 links to nine nodes N2 to N10, PageRank devalues N1's endorsement because N1 appears to indiscriminately endorse other Web pages relative to node N1 of FIG. 3A. Since node N1 of FIG. 3A endorses other nodes more selectively, N2 corresponding is assigned a higher score in FIG. 3A as a result of N1's link to N2 (all other factors being the same). The intuition of PageRank can further be explained by comparing FIG. 3C to FIG. 3A. In this comparison, the score assigned to the endorsing node N1 in FIG. 3C is 10 times the score assigned to the endorsing node N1 in FIG. 3A. Accordingly, because the quality (score) of the endorsing node is higher in FIG. 3C, the score assigned to node N2 is higher in FIG. 3C relative to the score assigned to node N2 in FIG. 3A. Combining the intuitions yields the PageRank algorithm.

Figure 3D:
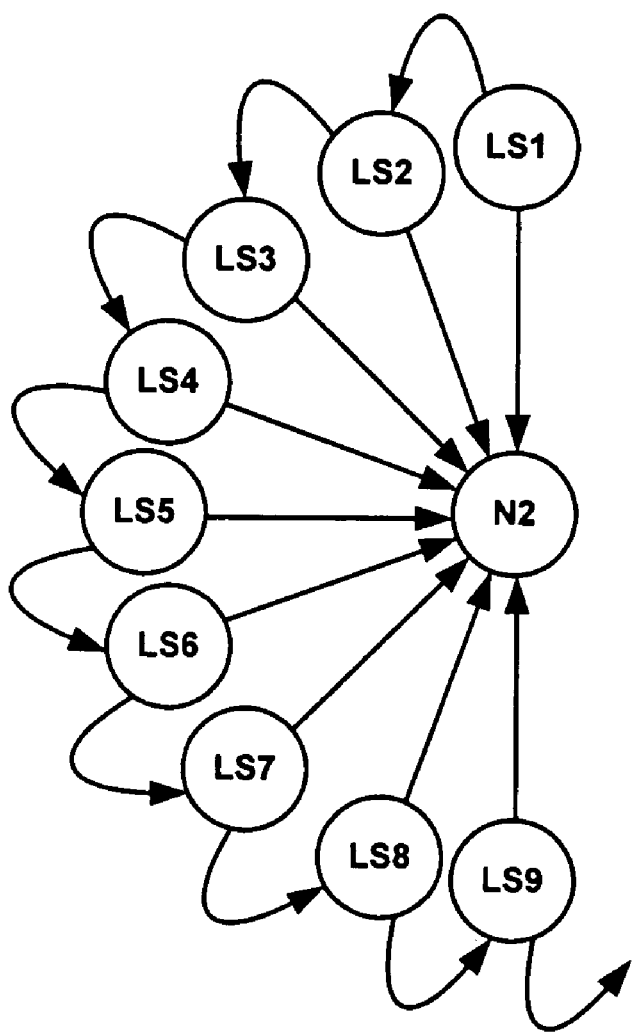

However, as noted in the background, PageRank is vulnerable to the scenario illustrated in FIG. 3D because every node, no matter how many other nodes it endorses or no matter how small its own PageRank score is, receives a minimum score. While this minimum score is small, in large numbers, the multiplication of a small score can become significant. Consequently, the owner of node N2, by manually or automatically creating a multitude of endorsing pages, each endorsing node N2 and each other in some fashion or arrangement such as the one illustrated in FIG. 3D, for example, can artificially inflate node N2's score. To do this in a cost effective manner, generally speaking, the link spammer will generally place each of the link spam nodes LS1 to LS9, and so on, on the same host (e.g., www.foo.com) since there is little to no cost to generating additional Web pages on the same host, such as www.foo.com/page1, www.foo.com/page2, www.foo.com/page3, and so on. Accordingly, a clever link spammer can increase the exposure of an unpopular Web page on the Web via this technique. The number of web pages is infinite, because there are some Web servers that dynamically create and serve an infinite number of pages. Clearly, the incremental cost to create another Web page is low.

Figure 3E:
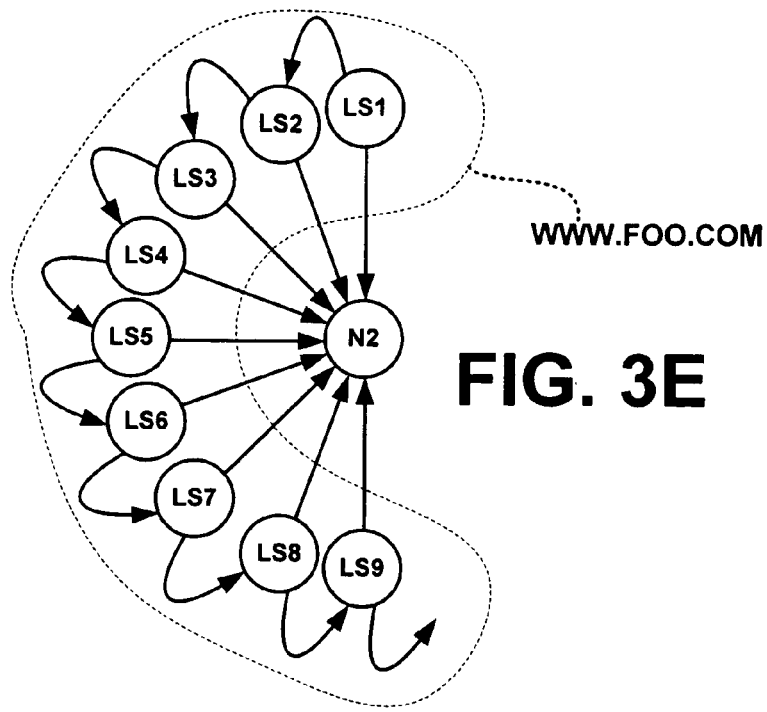

In response, the invention penalizes the use of such a link spam technique. Assuming that each of the link spam nodes LS1 to LS9 are all on the same host www.foo.com, instead of assigning a minimum score to each of LS1 to LS9, in one embodiment, the invention assigns a minimum score to each host, and distributes the minimum score among each of the nodes on the host. Thus, whether 1000 link spam nodes LS1 to LS1000, or whether one link spam node LS1 is present on the host www.foo.com, the contribution to the endorsement of node N2 is the same (assuming all other factors the same). Thus, as illustrated in FIG. 3E, the invention assigns a minimum score to host www.foo.com, and divides the minimum score among the pages LS1 to LS9.

Figure 3F:
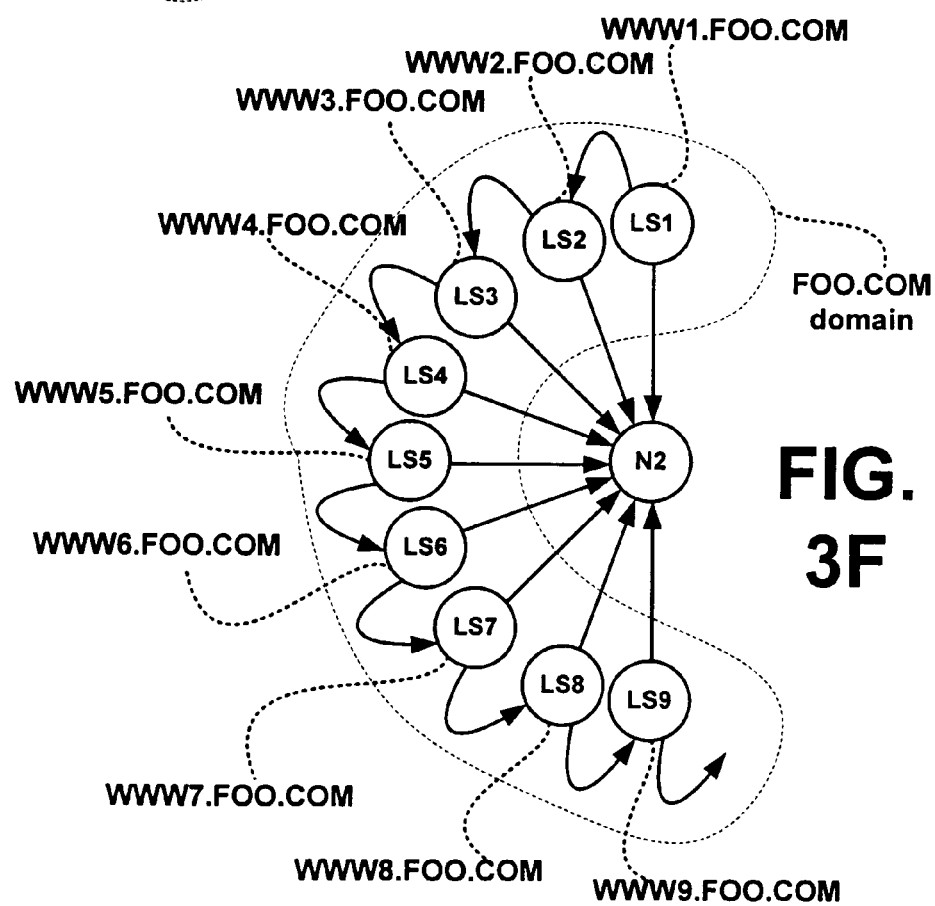

However, a determined link spammer is able to outwit this variant of the present invention. A link spammer may be determined to increase the quality score associated with his or her Web page a relatively small amount in order to outscore other Web pages with similar quality scores. For instance, a relatively small change in quality score may be of significant benefit to the link spammer if the Web page rises in the ranks of typical search engine results from being listed fifth to first in the rankings. In the current form of the Internet domain naming system, users pay a yearly fee (about $25) for each domain name, and are able to create an arbitrary number of symbolic host names within that domain. So, a link spammer can obtain a small number of domains, and configure a DNS server to resolve any possible host name within those domains. The spammer can then provide link spam pages that appear to come from many different hosts within these domains, thereby regaining the ability to endorse a page by accumulating the minimum scores of a very large number of pages. This scenario is illustrated in FIG. 3F, wherein a plurality of Web pages have been generated by the determined link spammer, each originating from a unique symbolic host name www1.foo.com, www2.foo.com, www3.foo.com, etc.; however, each also originates from a common domain foo.com. Accordingly, in a second embodiment of the invention, a minimum score is assigned not to each Web page or to each distinct host name, but rather to each distinct domain name.

Figure 3G:
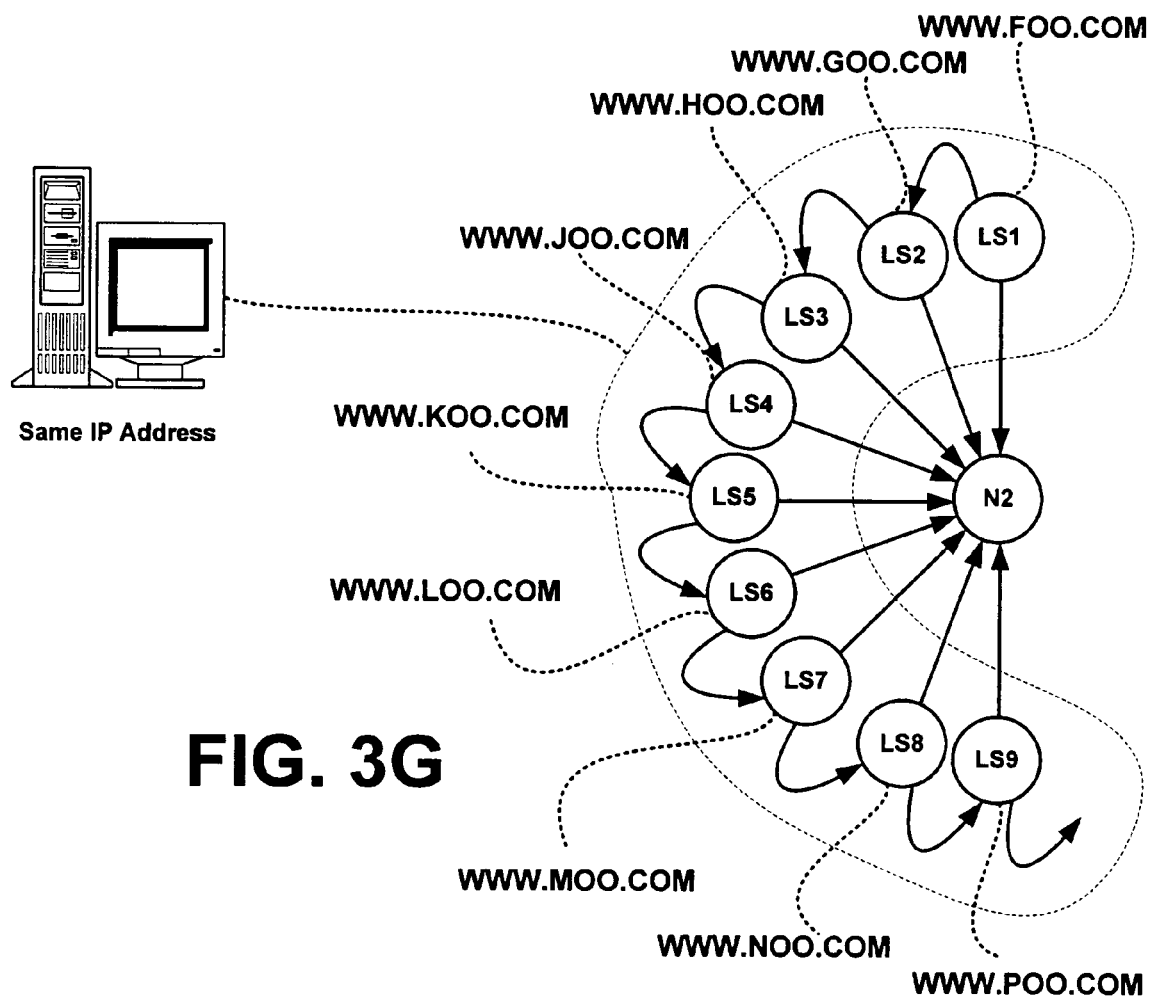

As it turns out, while domain names cost money, they are not extremely costly. While there are an infinite number of Web pages and potentially a large number ($37^{255}$) domain names, there are in reality on the order of 15 million domain names in existence. Creating a new host name is free (by configuring a DNS server to resolve any possible host name within a domain), whereas creating a new domain name costs on the order of $25. Thus, since a domain name can be obtained for about $25, it is still feasible for a determined link spammer to implement the system illustrated in FIG. 3G. In FIG. 3G, the determined link spammer has created link spam nodes LS1 to LS9, and so on, but this time, the link spammer has placed each node on its own domain with its own symbolic host name, www.foo.com, www.goo.com, www.hoo.com, and so on. The likelihood, however, is that the link spammer has placed each of www.foo.com, www.goo.com, www.hoo.com, and so on, at the same IP address. There are approximately 4 billion distinct IP addresses. While IP addresses are relatively inexpensive to obtain, the link spammer is unlikely to implement a system that assigns a distinct IP address per link spam Web page because the supply of distinct IP addresses is not infinite. Accordingly, in a third embodiment of the invention, a minimum score is assigned not to each Web page, each host name, or each domain, but to each distinct IP address, guarding against the determined link spammer because whether the link spammer places 100 distinct domains with link spam nodes on a server, or whether the link spammer places 1 distinct domain with one link spam node on the server, the effect in terms of endorsement of node N2 is the same (once again, holding all other factors constant).

Figure 4A:
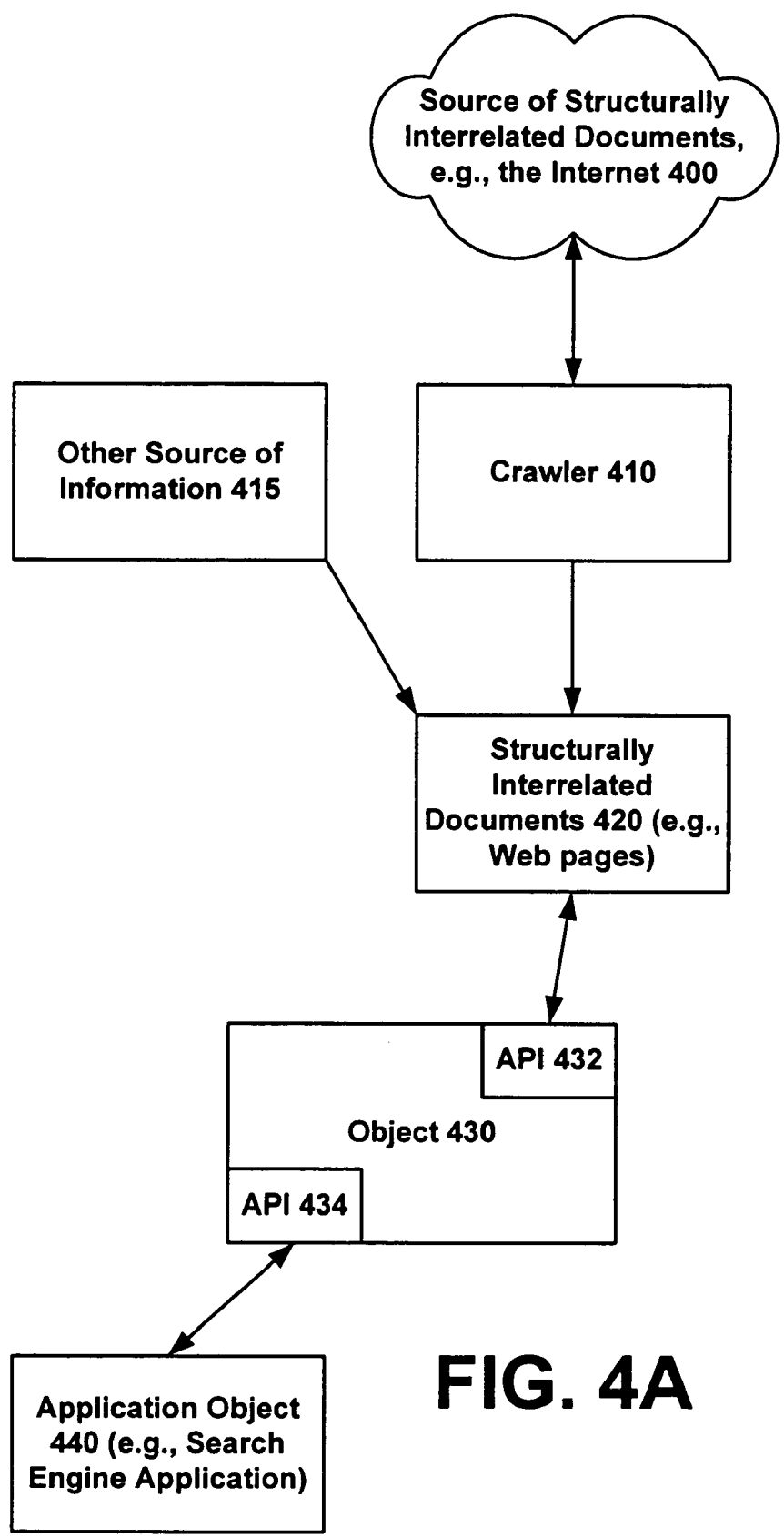
FIGS. 4A to 4C illustrate an exemplary implementation of the various embodiments of the present invention in a search engine application.

While the invention may be applied to rank any structurally interrelated documents, FIGS. 4A (system diagram), 4B and 4C (flow diagrams) illustrate exemplary application of the present invention to the ranking of Web pages for a search engine application. Since the algorithms of the invention are query independent, the process for ranking the documents according to the invention can take place independent of the application, such as a search engine, that requests documents based upon the scores assigned to the documents. For instance, as shown in FIG. 4A, one or more crawler(s) 410 can crawl a source of structurally interrelated documents 400, such as Web pages on the Internet, and retrieve the documents or relevant information about the documents for storage in a repository 420. Relevant information about documents can come from other source(s) 415 as well.

A crawler is a program that visits Web sites and reads their pages and other information in order to create entries for a search engine index. Crawlers are used to locate new documents and new sites by following hypertext links from server to server and indexing information based on search criteria.

The major search engines on the Web all have such a program, which is also known as a "spider," "ant," "robot" ("bot") or "intelligent agent." Crawlers are typically programmed to visit sites that have been submitted by their owners as new or updated. Entire sites or specific pages can be selectively visited and indexed. Crawlers apparently gained the name because they crawl through a site a page at a time, following the links to other pages on the site until all pages have been read. Typically, crawlers crawl many Web sites at the same time. Generally, crawlers adhere to the rules of politeness for Web crawlers that are specified in the Standard for Robot Exclusion (SRE).

Figure 4B:
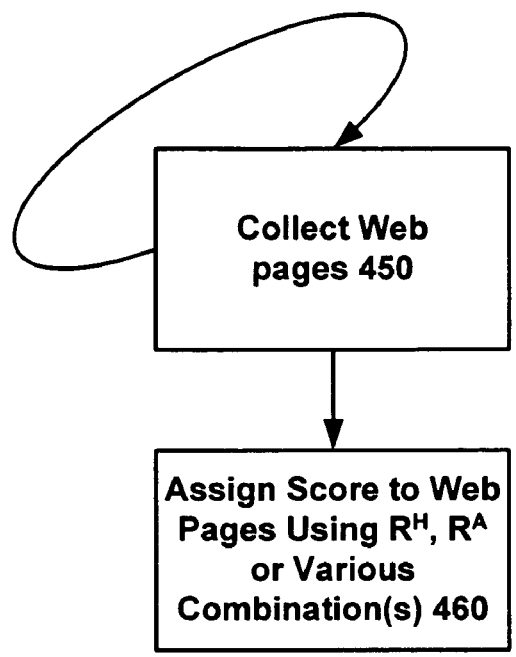
Figure 4C:
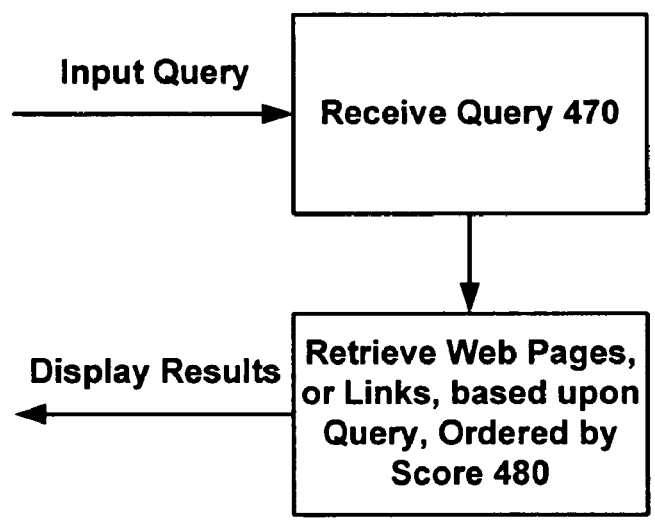

FIG. 4B illustrates the process of gathering documents via a flow diagram. At 450, Web pages are discovered and Web pages and/or information about the Web pages are collected via crawler(s). This can be an iterative, or ongoing process, as implied by the arrow. At any given point in time where the structure of the collection of documents is known, at 460, the invention can be applied to assign a score to each of the documents collected, so that a repository of Web pages (or links thereto) exists each having an associated quality score using the $R^A$ metric, the $R^D$ metric, or the $R^H$ metric. Object 430, via API 432, can perform the intelligence behind assigning a score to each of the documents in repository 420. It can also be appreciated, as described in more detail below, that the $R^A$, $R^D$, and/or $R^H$ metrics can be combined with other metrics to increase the quality of the score assigned to a document vis-à-vis a particular application or user.

Once an initial repository of documents and scores 420 is generated, which can be iteratively, continuously, or periodically updated, the exemplary application of a search engine can then be applied. For instance, search engine (or other application) object 440 may receive at 470 an input query from a user. At 480, based upon the query, Web pages including the query terms according to the query criteria, can be retrieved and ranked according to their associated scores, such that the most quality documents are displayed to the user first, or more prominently. In an exemplary implementation, as shown in FIG. 4A, the query is received by a search engine server object 440, which interfaces with object 430 via API 434. Object 430 retrieves and orders relevant Web pages (or links to Web pages) from repository 420 via API 432 based upon the query. Object 430 then returns the ordered list of results to application object 440 for display to the user. Alternatively, object 440 can perform the ordering of the results based upon the associated scores.

As should be clear, the metrics of the invention may also be combined, or combined with other improvements to the overall metrics. For instance, with a root set of "trusted" documents, the overall quality of the scores achieved with any of the metrics can be improved. Such improvements include taking Nielsen ratings into account. For instance, the top rated Nielsen Web pages could be used as a trusted base of Web pages from which to measure other scores. Moreover, Nielsen ratings could be used in combination with the metric(s) of the invention to assign a weighted score. Or, the results of the metric(s) of the invention could be compared against the Nielsen ratings to discover anomalous results.

In essence, any extraneous source of information about the trustworthiness of documents, such as Web pages, can be used in combination with, or to verify, the results of the metric(s) of the invention. Other examples include using information based upon the collection of user information from an ISP. For instance, an ISP can collect straightforward information, similar to the Nielsen information, about how frequently users visit certain Web pages, and accordingly can assign a quality, popularity, or trustworthiness, score based upon usage patterns. ISP proxy logs can be examined for this purpose. Another example includes observing people on a search engine. Merely because a Web page receives the highest score does not mean that users are most likely to select the Web page. Thus, user behavior on a search engine serves to validate the quality of Web pages. Additionally, one could assign human editors the job of certifying, for instance, 10,000 good Web pages. While an ongoing responsibility, the score of these 10,000 could be inflated such that their endorsement power via the metrics of the invention would be inflated, since they are known to be trusted Web pages. Another source of information about quality Web pages can come from a user's preferences, such as the user's bookmarks. In short, the metric(s) of the present invention can be combined with any other known quality metrics to ensure that the best user experience is provided. Advantageously, any of the combinations including the metric(s) of the present invention will thwart the efforts of link spammers.

There are multiple ways of implementing the present invention, e.g., an appropriate API, tool kit, driver code, operating system, control, standalone or downloadable software object, etc. which enables applications and services to use the ranking systems and methods of the invention. The invention contemplates the use of the invention from the standpoint of an API (or other software object), as well as from a software or hardware object that receives Web pages or structural information relating to Web pages for application of the ranking techniques in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to rank structurally interrelated documents. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the ranking techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of a Web search service, the invention is not limited to the context of Web search services, but rather may be implemented to provide a kind of quality metric to any set of documents or content, which in some fashion refer to one another. For instance, a user may have a set of pictures, movie, songs, etc. stored on his or her computer (or across multiple computing devices) that interrelate structurally in some fashion (by people, places, times, events, artist, album, title, actors, etc.) and the scoring of the invention may be applied to the pictures based upon the structural interrelationships of the content. For instance, a similarity, or other relationship, between a first content and a second content may be considered a link from the first content to the second content. Also, while API 432 is described above in connection with the scoring process, it is noted that a separate API may be implemented for that purpose, i.e., the use of API 432 to retrieve and order based upon a query need not be tied to the scoring process. Moreover, the term "in proportion to" as utilized herein refers to any mathematical relationship between two entities wherein when one entity increases, the other increases according to all known mathematical relationships including, but not limited to, geometric, linear, exponential, logarithmic and other relationships. The same applies to the term "inversely proportional" or "in inverse proportion to," i.e., when one entity increases, the other decreases. Additionally, since the term server can mean a variety of things in a variety of contexts, the term "Web server" as variously utilized herein is intended at least to refer to server computer(s) and/or server object(s) comprising any one or more of (A) a plurality of Web pages with the same symbolic host name, (B) a plurality of Web pages associated with the same domain, and (C) a plurality of Web pages associated with the same IP address. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. In a computing system comprising at least one processor and a memory communicatively coupled to said at least one processor, a method for adjusting a score of a document returned in a list of scored documents responsive to a search engine query, wherein a Web server is assigned a minimum score to be divided among documents hosted on the Web server and said minimum score increases in proportion to a number of structurally linked documents endorsing said document, the method comprising:

identifying, using said computing system, the Web server hosting said document, said Web server defined by at least one of: (A) a server comprising a plurality of Web pages with the same symbolic host name, (B) a server comprising a plurality of Web pages associated with the same domain, and (C) a server having a plurality of Web pages associated with the same IP address;

determining, on said computing system, an adjustment factor in inverse proportion to a total number of documents hosted on said Web server;

adjusting said score as a function of said adjustment factor, whereby when said number of documents on said Web server increases said score decreases and when said number of documents on said Web server decreases said score increases; and storing the adjusted score in said memory.

2. The method according to claim 1, further including:
assigning the score to the document in proportion to the number of structurally linked documents endorsing said document.

3. The method according to claim 1, further including:
assigning the score in proportion to at least one score assigned to at least one of said structurally linked documents endorsing said document.

4. The method according to claim 1, further including:
assigning the score in proportion to (A) the number of structurally linked documents endorsing said document and (B) at least one score assigned to at least one of said structurally linked documents endorsing said document.

5. The method according to claim 2, further including:
assigning the score to the document in inverse proportion to the number of outlinks of at least one of said structurally linked documents endorsing said document.

6. The method according to claim 1, wherein said adjusting includes adjusting the score in inverse proportion to the number of documents located on the same domain as said document.

7. The method according to claim 1, wherein said adjusting includes adjusting the score in inverse proportion to the number of documents having the same symbolic host name as said document.

8. The method according to claim 1, wherein said adjusting includes adjusting the score in inverse proportion to the number of documents associated with the same internet protocol (IP) address as said document.

9. The method according to claim 1, further comprising:
adjusting the score based upon summing the scores of the at least one other document linking to said first document.

10. The method according to claim 1, wherein the structurally linked documents are Web pages having hyperlinks and the document is a Web page.

11. The method according to claim 1, further including outputting the adjusted score of the document to a component of a Web search service.

12. The method according to claim 1, further including assigning a set of documents scores higher than an average minimum score.

13. The method according to claim 12, wherein the set of documents is based on at least one of Nielsen ratings, ratings assigned by humans, Web page usage patterns extracted from ISP proxy logs, Web page usage patterns extracted from a search engine and documents specified according to a user preference.

14. The method according to claim 1, further including altering the adjusted score of the document based upon an additional scoring technique to said adjusting the score.

15. The method according to claim 14, further including comparing the adjusted score against said additional scoring technique to discover anomalous results.

16. In a computing system comprising at least one processor and a memory communicatively coupled to said at least one processor, a method for assigning a score to a document of a plurality of structurally linked documents, the document is hosted on a Web server and the Web server is assigned a minimum score to be divided among documents hosted on the Web server and said document is returned in a list of scored documents responsive to a search engine query, the method comprising:

locating said document on the Web server defined by at least one of: (A) a server comprising a plurality of the Web pages with the same symbolic host name, (B) a server comprising a plurality of Web pages associated with the same domain, and (C) a server having a plurality of Web pages associated with the same IP address, wherein said document has at least one backlink from at least one source document of the plurality of structurally linked documents;

calculating the score of the document in proportion to at least one score associated with at least one of the at least one source document;

calculating the score in inverse proportion to a total number of said at least one source document located on said Web server resulting in said score being divided among said total number of documents, whereby when said number of documents increases said score decreases and when said number of documents decreases said score increases; and storing the score in said memory.

17. The method according to claim 16, wherein the score is calculated inversely proportional to the number of said at least one source document located on the same Web server.

18. The method according to claim 17, wherein the score is calculated inversely proportional to the number of said at least one source document having the same symbolic host name.

19. The method according to claim 17, wherein the score is calculated inversely proportional to the number of said at least one source document associated with the same domain.

20. The method according to claim 17, wherein the score is calculated inversely proportional to the number of said at least one source document associated with the same internet protocol (IP) address.

21. The method according to claim 16, wherein the plurality of structurally linked documents are Web pages having hyperliniks and the document is a Web page.

22. A computer readable medium storing computer executable instructions for assigning a score to a document of a plurality of structurally linked documents, wherein the document is located on a Web server assigned a minimum score to be divided among documents hosted on the Web server and the document is returned in a list of scored documents responsive to a search engine query, the documents having at least one backlink from at least one other document of the plurality of structurally linked documents, the medium comprising:

instructions for locating said document on the Web server defined by at least one of: (A) a server comprising a plurality of Web pages with the same symbolic host name, (B) a server comprising a plurality of Web pages associated with the same domain, and (C) a server having a plurality of Web pages associated with the same IP address;

instructions for assigning the score to the document in inverse proportion to a total number of documents located on said Web server resulting in said score being assigned to said document by being distributed among said number of documents, including said document, whereby when said number of documents increases said score assigned to said document decreases and when said number of documents decreases said score assigned to said document increases; and instructions for storing the score in a memory.

23. The computer readable medium according to claim 22, further including:

instructions for assigning the score to the document in proportion to the number of said at least one other document.

24. The computer readable medium according to claim 22, further including:

instructions for assigning the score in proportion to at least one score assigned to at least one of said at least one other document.

25. The computer readable medium according to claim 22, further including:

instructions for assigning the score in proportion to (A) the number of said at least one other document and (B) at least one score assigned to at least one of said at least one other document.

26. The computer readable medium according to claim 23, further including:

instructions for assigning the score to the document in inverse proportion to the number of outlinks of at least one of said at least one other document.

27. The computer readable medium according to claim 22, wherein said instructions for assigning include instructions for assigning the score to the document in inverse proportion to the number of documents located on a Web server with the same symbolic host name as said document.

28. The computer readable medium according to claim 22, wherein said instructions for assigning include instructions for assigning the score to the document in inverse proportion to the number of documents located on the same domain as said document.

29. The computer readable medium according to claim 22, wherein said instructions for assigning include instructions for assigning the score to the document in inverse proportion to the number of documents associated with the same internet protocol (IP) address as said document.

* * * * *

UNITED STATES PATENT AND TRADEMARK OFFICE
CERTIFICATE OF CORRECTION

| | |
|---|---|
| PATENT NO. | : 7,739,281 B2 |
| APPLICATION NO. | : 10/663933 |
| DATED | : June 15, 2010 |
| INVENTOR(S) | : Marc A. Najork |

It is certified that error appears in the above-identified patent and that said Letters Patent is hereby corrected as shown below:

In column 20, line 20, in Claim 16, after "of" delete "the".

In column 20, line 55, in Claim 21, delete "hyperliniks" and insert -- hyperlinks --, therefor.

Signed and Sealed this

Eighth Day of February, 2011

David J. Kappos
*Director of the United States Patent and Trademark Office*